(12) United States Patent
Aujames et al.

(10) Patent No.: US 8,190,635 B2
(45) Date of Patent: May 29, 2012

(54) METHOD AND SYSTEM FOR STORING AND RETRIEVING INFORMATION

(75) Inventors: Céline Aujames, Biot (FR); Raphaël Grangeon, Antibes (FR); Fabien Lisiecki, Antibes (FR); Mélinda Monteillet, Mandelieu (FR); Sylvain Roy, Nice (FR); Jeffrey Barrett, Entrecasteaux (FR)

(73) Assignee: Amadeus s.a.s., Biot (FR)

( * ) Notice: Subject to any disclaimer, the term of this patent is extended or adjusted under 35 U.S.C. 154(b) by 601 days.

(21) Appl. No.: 12/269,243

(22) Filed: Nov. 12, 2008

(65) Prior Publication Data

US 2010/0114834 A1 May 6, 2010

(30) Foreign Application Priority Data

Nov. 4, 2008 (EP) .................................... 08305772

(51) Int. Cl.
*G06F 17/30* (2006.01)
(52) U.S. Cl. ...................................................... 707/781
(58) Field of Classification Search .................. 707/781, 707/999.009
See application file for complete search history.

(56) References Cited

U.S. PATENT DOCUMENTS

| | | | |
|---|---|---|---|
| 7,325,132 B2 * | 1/2008 | Takayama et al. ............. 713/168 |
| 7,650,353 B2 * | 1/2010 | Machiraju et al. ..... 707/999.101 |
| 7,673,794 B2 * | 3/2010 | Yoshioka ....................... 235/380 |
| 2004/0193553 A1 * | 9/2004 | Lloyd et al. ...................... 705/78 |
| 2004/0205348 A1 * | 10/2004 | Watanabe et al. ............. 713/182 |
| 2006/0004771 A1 * | 1/2006 | Enenkiel .......................... 707/10 |
| 2006/0200671 A1 * | 9/2006 | Ishigaki et al. ................ 713/176 |
| 2008/0240447 A1 * | 10/2008 | Zhu et al. ....................... 380/279 |
| 2009/0300719 A1 * | 12/2009 | Ferris ................................. 726/3 |

OTHER PUBLICATIONS

Callas et al., OpenPGP Message Format, Nov. 2007.*

* cited by examiner

*Primary Examiner* — James Trujillo
*Assistant Examiner* — William Spieler
(74) *Attorney, Agent, or Firm* — Young & Thompson

(57) ABSTRACT

A method of storing and retrieving a utilization data associated to a sensitive information which requires to be secured in an environment including a plurality of application systems that can use the information, includes:
  at a given application system of the plurality of application systems: receiving the information, generating from the information an extracted data and a complementary data, generating an encoded information from the information, sending the extracted data and the encoded information to a server system,
  at the server system: generating an index and assigning it to the encoded information and the extracted data, storing the encoded information, the extracted data, and the index in a database associated to the server system, forwarding the index to the given application system of the plurality of application systems,
  at the given application system: assigning the index to an application stored data related to the information, storing the index and the application stored data in a database associated to said given application server.

22 Claims, 6 Drawing Sheets

METHOD AND SYSTEM FOR STORING AND RETRIEVING INFORMATION

FIELD OF THE INVENTION

The present invention relates generally to a method and a system for storing and retrieving electronic information. The method and system of the invention are particularly directed to the storage of electronic information that requires to be secured and that must be available for use by various applications. The method also refers to a method for storing and retrieving applicative data that relates to said information.

BACKGROUND OF THE INVENTION

Securing the storage and the manipulation of sensitive information is a major issue in particular for organizations wherein many applications have to use such sensitive information.

The development of electronic transactions increases the number of transactions requiring sensitive information. Besides, in order to facilitate the transactions and to be more attractive for users, many organizations strive to obviate the need for re-entering all needed data to complete a transaction. This implies to store sensitive information. Yet, storing sensitive information can hardly be totally secure. Indeed, databases storing sensitive information may possibly be stolen, or hacked. Moreover, sensitive information may possibly be illegally retrieved during its transmission from the database that stores it to the application that processes it.

To increase the security of the storage, some systems allow to split the sensitive information in two parts and to store each part in a respective database.

However, these systems have turned out to be not totally satisfactory in particular in an environment where various applications need to process the same sensitive information.

These various applications may be run by a single organization that provides many services. Global Distribution Systems (GDS) such as AMADEUS or SABRE are typical examples of such organizations that provide many services involving various applications which require sensitive information.

Several distinct companies may also cooperate to provide integrated services to customers. For instance, an e-merchant and a bank may cooperate to provide customers with easy online purchase solutions. Several merchants can also cooperate to form an organization and provide customers with a wider range of services and products.

It is an object of the invention to provide an efficient and user attractive method for storing and retrieving information in an environment wherein many applications may need to process the same sensitive information.

SUMMARY OF THE INVENTION

The invention describes a method of storing and retrieving a utilization data associated to a sensitive information which requires to be secured in a distributed environment comprising a plurality of application systems $ASi_{i=1...n}$ that can use said information and said utilization data. Typical examples of sensitive information are credit card numbers. Storing said information comprises the below mentioned steps.

A given application system $AS_j$ of said plurality of application systems $ASi_{i=1...n}$ receives said information and generates from said information an extracted data and a complementary data. The extracted data and the complementary data are generated in such a manner that:

when they are taken independently it is not possible for any application system $ASi_{i=1...n}$ to use the sensitive information and, when they are taken together said information can be generated and used.

Further, the given application system $AS_j$ generates an encoded information from said information. Then, it sends the extracted data and the encoded information to a server system SS.

The server system SS generates an index ID and assigns this index ID to the encoded information and the extracted data. Then the server system SS stores the encoded information, the extracted data, and the index ID in a database $DB_{SS}$ associated to the server system SS. The server system SS further forwards the index ID to the given application system $AS_j$ of the plurality of application systems $ASi_{i=1...n}$.

Then, said given application system $AS_j$ assigns the index ID to an application stored data related to the information. Finally, the given application system $AS_j$ stores the index ID along with said application stored data in a database $DB_{ASj}$ associated to said given application server $AS_j$.

According to a first use case of the invention the utilization data is the information and the application stored data is the complementary data.

Thus, the given application system $AS_j$ only sends the extracted data and the encoded information. There is no exchange of sensitive information. Besides, since the database $DB_{ASi}$ of the given application system $AS_j$ only stores the complementary data and the ID and since the database $DB_{SS}$ of the server system only stores, the extracted data, the encoded information and the index ID, then extracted and complementary data are never stored in the same database. Therefore, sniffing the network, stealing, or hacking any one of the database of the given application system $AS_j$ or the database of the server system $DB_{SS}$ does not enable to get either complementary and extracted data or the full information. Therefore the information cannot be rebuilt and illegally used.

Besides, the index ID is generated by the server system SS and not by the given application system $AS_i$ which receives the information. Thus, an index ID is assigned to a single pair formed of encoded information and extracted data. Therefore, there is no concurrent index ID related to the same information. In order to exchange data related to a given information, the various application systems $ASi_{i=1...n}$ can share the unique index ID associated to said information. Accordingly, the invention is particularly convenient to store sensitive information in a distributed environment wherein many application systems $ASi_{i=1...n}$ use said sensitive information.

The database $DB_{SS}$ of the server system SS stores the extracted data, along with the encoded information and the index ID. Thus, an application system can receive either the extracted data when said application system is provided with the index ID or to receive the index ID when said application system accesses the extracted data and the encoded information. Therefore, such method allows to provide the plurality of application systems $ASi_{i=1...n}$ with various data that these application systems $ASi_{i=1...n}$ require to handle predetermined uses. Accordingly, the invention allows secured storage for various operations that the plurality of application systems $ASi_{i=1...n}$ handles.

Even if one or many applications modules $ASi_{i=1...n}$ are stolen, forced or hacked, the information cannot be retrieved. Indeed getting the encoding process does not enable to obtain the information since neither the extracted data nor the encoded information are stored in the databases $DB_{ASi}$ associated to the various application systems $ASi_{i=1...n}$. Therefore the invention enhances the information storage security.

According to the invention, retrieving the sensitive information at any considered application system $AS_k$ amongst the plurality of application systems $ASi_{i=1...n}$ comprises the following steps. Said considered application system $AS_k$ receives the index ID, and sends the index ID to the server system SS. The server system SS retrieves from the database of the server system SS the extracted data corresponding to said ID. It further sends the extracted data to said considered application system $AS_k$. Then, the considered application system $AS_k$ receives the complementary data and rebuilds the information from the extracted and the complementary data. Thus, an application of the considered application system $AS_k$ can use the information.

The full sensitive information is never exchanged nor stored. The information is only available at the considered application $AS_k$ system when said considered application system $AS_k$ handles a process that requires said sensitive information. Typically, the information is stored in the process memory and nowhere else. Once the use is completed, the information is removed. Besides, the extracted and complementary data are not stored in the same database. Therefore, sniffing the networks or stealing any one of the databases does not enable to obtain the sensitive information.

Since the invention allows to make the sensitive information available through entering a mere index, the invention obviates additional re-entering or manipulation of the sensitive information. Therefore, the invention decreases the risk of loss or theft of said sensitive information when the user manipulates or enters it.

According to a first event of this first use case, said considered application system $AS_k$ is the given application system $AS_j$. Thus, the step of receiving the complementary data at said considered application system $AS_k$ comprises receiving the index ID at said given application system $AS_j$ and retrieving thanks to the index ID the complementary data which is stored in the database $DB_{ASj}$ associated to the given application system $AS_j$.

Thus, in case the considered application system $AS_k$ which needs the information has already been provided with this information, the complementary data can be retrieved upon reception of the index ID directly from the database $DB_{ASk}$ of the considered application system $AS_k$. Moreover, sending the index to the server system SS triggers the forwarding of the extracted data from the server system SS. Then the application system $AS_k$ gets the extracted and complementary data and can obtain the required information.

According to a second event of this first use case, said considered application system $AS_k$ is different from the given application system $AS_j$. Besides, the considered application $AS_k$ does not comprise a database which indexes the complementary data along with the index ID. Thus, the above-mentioned step of receiving the complementary data at said considered application system $AS_k$ comprises receiving the complementary data from the given application system $AS_j$.

More particularly when a considered application $AS_k$ receives an index ID and requires the information corresponding to this index ID, it checks whether this index ID is stored in its associated database $DB_{ASk}$. In case this database does not comprise this index ID, or does not comprise the complementary data corresponding to said index, said considered application $AS_k$ system sends a request. This request comprises the index ID for which information is required. The request arrives to the given application system $AS_j$. The given application system $AS_j$ is associated to a database which indexes the complementary data with the index ID.

In response to said request, the given application system $AS_j$ retrieves from its database $DB_{ASj}$ the complementary data and forwards it to the considered application system $AS_k$. Further, the considered application $AS_k$ system sends the index to the server system SS in order to receive the extracted data. Thus, the considered $AS_k$ application system can combine the complementary data and the extracted data to obtain and use the required information.

The considered application $AS_k$ system may further store the complementary data in its database and index it with the index ID. Thus, next time the considered application $AS_k$ system will be able to obtain the information without requiring that the given application $AS_j$ system forwards it the complementary data.

Therefore, several distributed application systems can exchange data in order to enable a considered application to obtain the required information though this considered application has never been provided so far with said information.

Accordingly, the invention provides a secured method that obviates the need for customers to re-enter information once said information has already been entered in any one of the application systems of the distributed environment.

Besides, the exchange of data between various application systems is totally user transparent.

According to a second use case of the invention, the utilization data and the application stored data are identical and are applicative data. These applicative data are intended to be used by at least an application of an application system $ASi_{i=1...n}$. Besides, said applicative data do not require a high level of security. Therefore applicative data can be stored as such in the database of a given application $AS_j$. For instance, applicative data may relate to a user profile data (user loyalty program, user preferences, flight departure and/or arrival, service requests associated to the flight, hotel or car rental information, customer profile data etc.).

Retrieving said applicative data at any considered application system $AS_k$ comprises the following steps. Said considered application system $AS_k$ receives the sensitive information. It generates the extracted data and the encoded information from said information. The considered application system $AS_k$ sends the extracted data and the encoded information to the server system (SS).

Then, the server system (SS) retrieves from the database of the server system $DB_{SS}$ the index ID corresponding to the pair formed of both extracted data and encoded information. It forwards the index ID to said considered application system $AS_k$.

The considered application system $AS_k$ receives the index ID and retrieves the applicative data indexed with the index ID. Thus, an application of the considered application system $AS_k$ can use the applicative data.

Like for the first use case, in this second use case, the risk of theft of the credit card is significantly reduced since neither the considered application system $AS_k$, nor the server system keeps the full information. Besides, neither is full information ever transmitted in a single transmission between any application system $AS_{i=1...n}$ and the server system SS.

According to a first event of this second use case, the considered application system $AS_k$ is the given application system $AS_j$. Thus, the applicative data is retrieved from the database $DB_{ASj}$ associated to the given application system $AS_j$.

Thus, applicative data can be quickly retrieved once entering the information at any application system. This allows easy and user friendly use of said application.

Besides, said retrieval of information is highly secured. Indeed the database of the given application system $AS_j$ does not even have to comprise any of the complementary data, extracted data or information. The database of the server system SS does not comprise the complementary data or the information. Only the encoded information and the extracted data and the extracted data are sent to the server system.

Thus, the complementary and extracted data are never stored in the same database and the information is only available in the process memory of the application when generating the extracted data and the encoded information. Accordingly, sniffing the network, stealing, or hacking any database turns out to be worthless.

According to a second event of this second use case, the considered application system $AS_k$ is an application system which is different from the given application system $AS_j$. Said application system $AS_k$ does not comprise in its associated database $DB_{ASk}$ the applicative data indexed with the index ID. Thus, retrieving the applicative data comprises the steps indicated below. Upon reception of the index ID from the server system, the considered application system $AS_k$ sends said index ID to the given application system $AS_j$. Then the given application system $AS_j$ receives the index ID and retrieves from its database $DB_{ASj}$ the applicative data thanks to the index ID. Finally, the given application system $AS_j$ sends the applicative data to the considered application system $AS_k$.

This second event of the second case highlights the fact that even in case a considered application system $AS_k$ does not store a required applicative data, this considered application system $AS_k$ can be provided with this applicative data while keeping a high level of security for the sensitive information. Indeed, this sensitive information is never stored nor transmitted in a single transmission between any of the application system or between any application system and the server system.

In a preferred embodiment the step of generating complementary data and extracted data includes dividing the information into a first portion and a second portion.

The invention is particularly well convenient for method wherein the information is a credit card number. Then, the complementary data can correspond to apparent digits of the credit card number and the extracted data can correspond to concealed digits of the credit card number.

The step of generating an encoded version of the information may include computing a hashed value of the information through a hash function. In a preferred embodiment, the hashed function is unknown to the server system (SS). Therefore, the invention allows to significantly limit the risk that a person may obtain the sensitive information through accessing the encoded version of the information.

The invention also provides a system for storing and retrieving a utilization data associated to an information which requires to be secured in a distributed environment, comprising a plurality of application systems $ASi_{i=1 \ldots n}$ that can use said information and said utilization data. The system of the invention includes a server system SS, and a given application system $AS_j$ amongst said plurality of application systems $ASi_{i=1 \ldots n}$. Said given application system $AS_j$ is arranged for:
receiving said information,
generating from said information an extracted data and a complementary data, such that said extracted data and said complementary data taken independently being insufficient for using said information CC# by any application system $ASi_{i=1 \ldots n}$ and such that said information can be generated and used from said extracted and complementary data taken together,
generating an encoded information from said information,
sending the extracted data and the encoded information to a server system SS.

The server system SS is arranged for:
generating an index ID and assigning this index ID to the encoded information and the extracted data,
storing the encoded information, the extracted data and the index ID in a database $DB_{SS}$ associated to the server system SS,
forwarding the index ID to said given application system $AS_j$ of the plurality of application systems $ASi_{i=1 \ldots n}$, The given application system $AS_j$ is also arranged for:
assigning the index ID to an application stored data related to the information,
storing the index ID along with said application stored data in a database $DB_{ASj}$ associated to said given application server $AS_j$.

More generally, the system according to the invention comprises the server system and the application systems ASi which are arranged for conducting the method described above.

The application system that manipulates the sensitive information comprises a process memory and is arranged so that the information is available only in the process memory.

Once the application system has used the information, it deletes said information. Therefore, the sensitive information is no more accessible after use. This limits the risks of theft.

In a preferred embodiment, the system comprises at least a cache mechanism in the processing means of an application system (ASi). The cache mechanism is arranged to store the information during the processing of said information. There is one cache instance per process.

In a preferred embodiment of the invention, the system comprises a proxy component which is part of the secured storage system and which is comprised in the application system. The role of the proxy component is to handle at least one of the following steps that are intended to occur at the application system which hosts the proxy component:
generating the complementary data and the extracted data from the information,
generating the encoded information from said information,
sending the extracted data and the encoded information to the server system SS,
sending the complementary data in the database associated to the application system hosting the proxy component,
generating messages including the data to be sent from the application system hosting the proxy component, said messages being in EDIFACT like format,
reading messages including the data to be received at the application system hosting the proxy component, said messages being in an EDIFACT like format.

Typically, the proxy component can be a middleware library. It provides various API (Application Programming Interfaces) that interface the application of the application system with the server system. The proxy component can also comprise a cache mechanism.

Through handling information processing and data exchanges, the proxy component significantly facilitates the integration of any application in the system of the invention.

In another embodiment of the system of the invention, the application system does not comprise a proxy component and handles all required actions by its own. Thus, such an application system can for instance format/read messages from the server system, computes the encoded version of the information etc.

In a particular embodiment of the invention, the method comprises the following steps at any considered application system $AS_k$. The considered application system $AS_k$ generates a request message comprising several indexes ID. Then, it sends to the server system said request message. Further, the server system searches its database and retrieves each extracted data associated to an index ID comprised in the request message. Then the server system sends a response message comprising the retrieved extracted data.

Then, the considered application system $AS_k$ receives the response message from the server system SS. Finally, the considered application system $AS_k$ can rebuild all the information for which the extracted data has been received from the server system.

Accordingly, with one single transaction an application system can send a list of indexes to the server system in order to receive all the extracted data corresponding to the list of indexes.

Such batch processes can also be used for retrieving applicative data. Indeed, a considered application system can send to the server system SS a request message that contains a list of extracted data and encoded versions of the sensitive information. The server system retrieves from its database each index that is assigned to a pair of extracted data and encoded version included in the request message. Then it sends to the considered application system a response message comprising the indexes that have been retrieved. Thus, the considered application system can retrieved the applicative data that are indexed with the indexes of the response message.

Therefore, such batch processes allow substantially simplifying and speeding up the retrieval of information for many users. Accordingly, the invention provides a method that enhances services offered to application's users. Such batch processes are particularly useful when new applications are migrating to the storage system of the present invention. Indeed when conducting migrations, large amount of data have to be stored quickly and easily.

According to the above mentioned embodiment, both extracted data and encoded information are sent to the server system in order to retrieve the index. Sending both extracted data and encoded information allows reducing significantly the risk to retrieve a wrong index.

According to an alternative embodiment, only the encoded information is sent to the server system in order to receive the index at the application system. Although the risk to get a wrong index with this embodiment is higher than when both extracted data and encoded information are in the request, said risk remains very low. Such alternative embodiment is particularly useful when dealing with large amount of data. Indeed it avoids manipulating and sending heavy extracted data to the server system.

Information can be constituted by numbers, letters, symbols or combination of the three. As designated in the present invention, information is not limited to numbers. Extracted data and complementary can also include numbers, letters, symbols or combination of the three. Applicative data may comprise any nature of data and kind of files such as numbers, letters, symbols, pictures, videos etc.

The system may also comprise additional security means. These security means are arranged for reinforcing the security of the exchanges between the various application systems and between the application systems and the server system. These security means can check whether the sender of each message is actually authorized. They can discard messages sent by non authorized senders. For instance, access to the server system may be limited to a limited number of authorized applications systems.

In practical, security means perform encryption and decryption of exchanged messages between the various components of the system. Security means may also comprise means for triggering a warning when an abnormal operation is attempted. They can also include means for monitoring and recording exchanges, transactions and processing of data.

BRIEF DESCRIPTION OF THE DRAWINGS

Other features, objects and advantages of the invention will become more clearly apparent from the description below, illustrated by the following figures.

DETAILED DESCRIPTION OF PARTICULAR EMBODIEMENTS

The following detailed description of the invention refers to the accompanying drawings. While the description includes exemplary embodiments, other embodiments are possible, and changes may be made to the embodiments described without departing from the spirit and scope of the invention.

Figure 1:
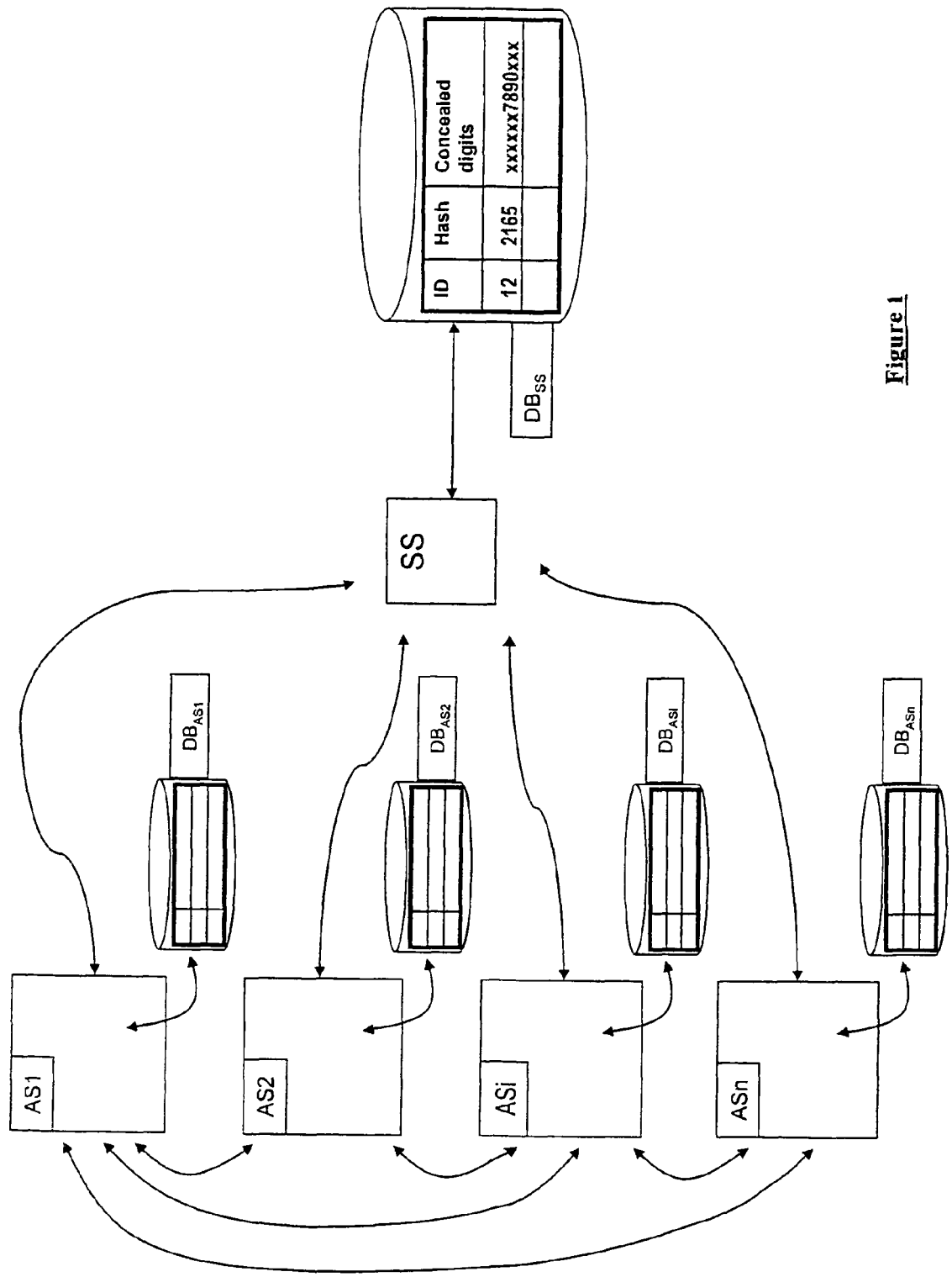
FIG. 1 is a high level block diagram of an example comprising the major components of a system according to the invention.

FIG. 1 illustrates a system according to the invention for storing and retrieving information.

The system comprises n application systems which are referenced $AS_1, AS_2 \ldots, AS_i \ldots, AS_n$. Each application system is associated to a database $DB_{AS1}, DB_{AS2} \ldots, DB_{ASi} \ldots, DB_{ASn}$. The application systems comprise applications that are intended to use sensitive information. They are run by an organization constituted of several companies that cooperate or by an organization like a GDS. To enhance efficiency of the services provided to users, the organization strives to obviate the need for a user to re-enter same data each time a transaction is conducted.

This also decreases the risk of loss or theft of sensitive information when the user manipulates or enters said sensitive information.

The system also includes a secured storage system which comprises a server system SS and a database $DB_{SS}$ associated to this server system SS.

The system also comprises a communication network, such as internet that interconnects each application system $AS_i$ with the server system SS. The communication network also allows the applications systems $AS_i$ to exchange information together in a distributed environment. Advantageously, the various components of the system are remotely located.

The components of the information storage system execute processes that provide secure storage and retrieval of sensitive or valuable information.

The secured storage and retrieval of sensitive information will be detailed below through illustrative use cases. In these use cases the sensitive information is a credit card number CC#. Usually, credit card number is formed of sixteen digits.

Figure 2:
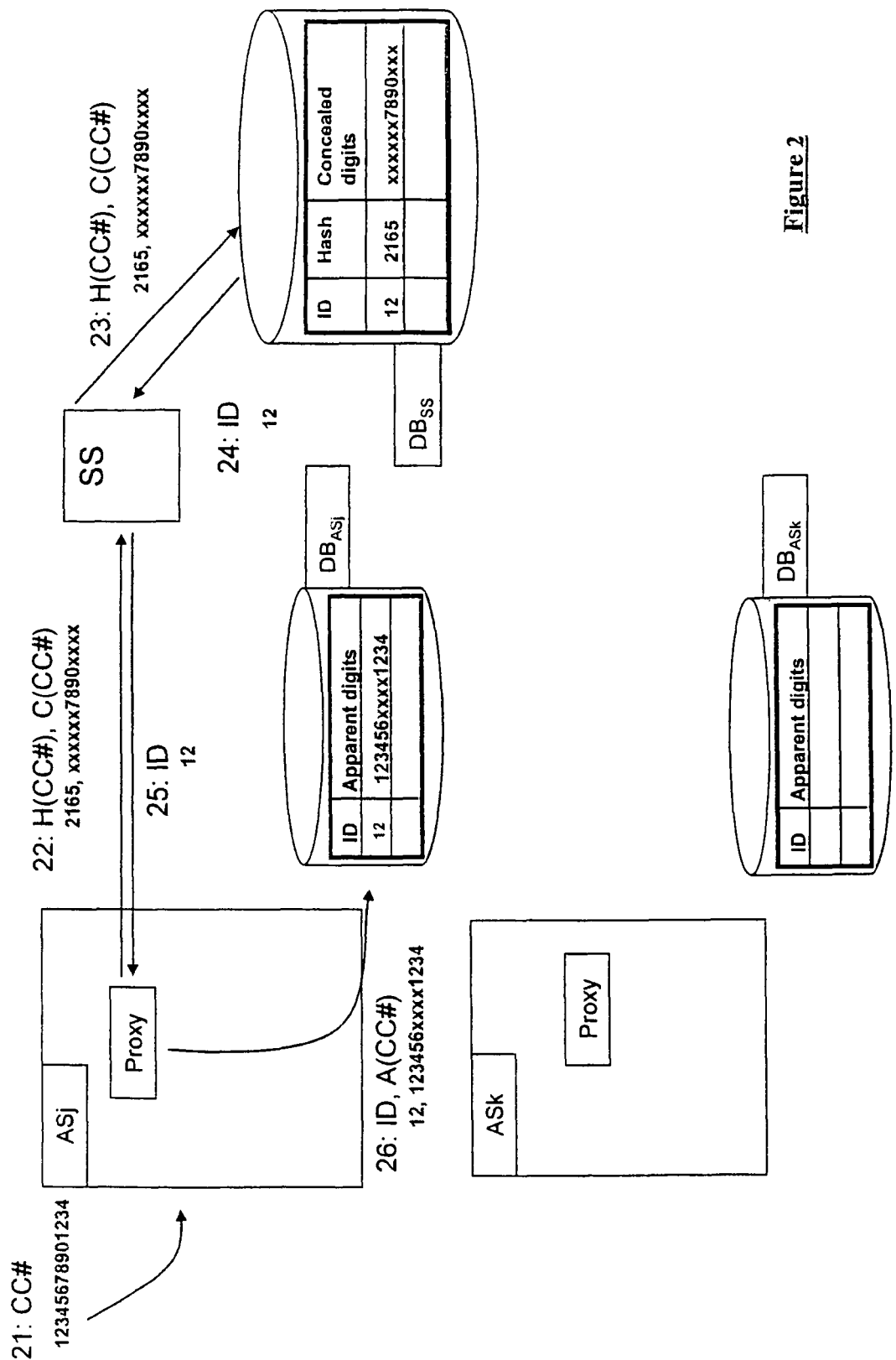
FIG. 2 is a high level block diagram illustrating a use case for storing sensitive information.

FIG. 2 illustrates how the invention allows storing sensitive information.

At step 21, an application system $AS_j$ amongst the plurality of application systems $ASi_{i=1...n}$ receives a credit card number CC#. Typically, this credit card number is received after the user has entered it through a conventional interface such a keyboard for instance. This credit card number must be easily available for use at a later stage without requiring the user to re-enter it. Therefore, this credit card number has to be stored. The application system $AS_j$ which handles the storage of the credit card number is designated first application system $AS_j$ in the following.

The first application system $AS_i$ divides the credit card number CC# into a first portion and a second portion. The first portion corresponds, in this illustrative example, to the first six digits and to the last four digits of the credit card number. This first portion will remain available at the application ASj. The second portion corresponds to the remaining six digits. This second portion will not remain available at the application system $AS_j$. In the following, the first and second portion are respectively designated apparent digits A(CC#) and concealed digits C(CC#).

The apparent digits A(CC#) and the concealed digits C(CC#) are generated in such a manner that:
when they are taken independently it is not possible for any application system $ASi_{i=1...n}$ to use the credit card number CC# and,
when they are taken together said credit card number CC# can be rebuilt and used.

The first application system $AS_j$ also generates an encoded version H(CC#) of the credit card number CC#. More particularly, the first application system $AS_j$ computes a hashed value of the credit card number CC#.

At step 22, the first application system $AS_j$ sends the concealed digits C(CC#) and the encoded credit card number H(CC#) to the server system SS.

The server system SS receives the concealed digits C(CC#) and the encoded credit card number H(CC#). It generates an index ID and assigns this index ID to the encoded credit card number H(CC#) and to the concealed digits C(CC#). Then the server system SS stores the encoded credit card number H(CC#), the concealed digits C(CC#), and the index ID in a database DBSS associated to the server system SS (step 23). The server system SS generates the index ID once it has checked in its database DBSS which index ID is available (step 24). If the two-uplet (H(CC#), C(CC#)) is already stored by the server system SS, then the index ID assigned to this two-uplet (H(CC#), C(CC#)) is retrieved and is returned to the application system. Thus, the check operated by the server system SS is not limited to checking the availability of the index ID.

At step 25, the server system SS further forwards the index ID to the first application system $AS_j$ of the plurality of application systems ($ASi_{i=1...n}$).

Then, the first application system $AS_j$ assigns the index ID to the apparent digits A(CC#). Finally, the first application system $AS_j$ stores the index ID along with apparent digits A(CC#) in its database $DB_{ASj}$ (step 26).

Thus, the first application system $AS_j$ only sends the concealed digits C(CC#) and the encoded H(CC#) credit card number. There is no exchange of the full credit card number CC#. Besides, since the database $DB_{ASj}$ of the first application system $AS_j$ only stores the apparent digits A(CC#) and the ID, and since the database $DB_{SS}$ of the server system only stores the concealed digits C(CC#), the encoded H(CC#) credit card number and the index ID, then concealed C(CC#) and apparent digits A(CC#) are never stored in the same database.

Therefore, sniffing the network, stealing, or hacking any one of the database of the first application system $AS_j$ or the database of the server system $DB_{SS}$ does not enable to get both apparent A(CC#) and concealed digits C(CC#) or the full credit card number CC#. Therefore the credit card number CC# cannot be rebuilt and illegally used.

Besides, the hashed processing is conducted at the server application $AS_i$. Thus, the function remains unknown to the server system SS. Therefore, the invention allows to significantly limit the risk that a person obtains the credit card number CC# through accessing the encoded version of the credit card number CC#.

Moreover, since no data sent by the application system $AS_j$ are stored in the database $DB_{ASj}$ of said application system $AS_j$, then, sent data cannot be reconciled with stored data. Therefore, it is also useless to both hack the database $DB_{ASj}$ of the application system $AS_j$, and sniff the message transmitted by this application system $AS_j$, in order to get the information (e.g. the credit card number CC#).

Concealed digits C(CC#) generated by each application system $AS_i$ are all stored together in the database $DB_{SS}$ of the server system. Yet, these concealed digits are mandatory to rebuild the full credit card number CC#. Thus, resources allocated to securing the sensitive information can be concentrated on the server system SS and its dedicated database DBss. The invention obviates the need to spread these resources between the various application systems $ASi_{i=1...n}$. Therefore, security can be significantly enhanced at the server system SS and at it associated database $DB_{SS}$ in order to prevent any kind of theft. This aspect is particularly advantageous in a distributed environment wherein the various application systems $ASi_{i=1...n}$ and the various databases $DB_{ASi}$ associated to application systems are all remotely located, and/or in a distributed environment wherein the various application systems $ASi_{i=1...n}$ and the various databases $DB_{ASi}$ are remotely located from the server system SS and its database $DB_{SS}$.

Besides, the index ID is generated by the server system SS and not by any application system $AS_j$. Thus, an index ID is assigned to a single credit card number CC#. Therefore, there is no concurrent index ID for the same credit card number CC#. In order to exchange data related to a given credit card number CC#, the various application systems $ASi_{i=1...n}$ can share the unique index ID associated to said credit card number CC#. Accordingly, the invention is particularly convenient to store credit card number CC# in a distributed environment wherein many application systems $ASi_{i=1...n}$ use said credit card number CC#.

For instance, various application systems of an organization may share data to obviate the need for a user to re-enter its credit card number at any application system $AS_k$ once the full credit card number has already been entered at the first application system $AS_j$. This use case will be detailed below with reference to FIG. 4.

Therefore, the invention contributes to enhance the efficiency of the services provided to application users.

Figure 3:
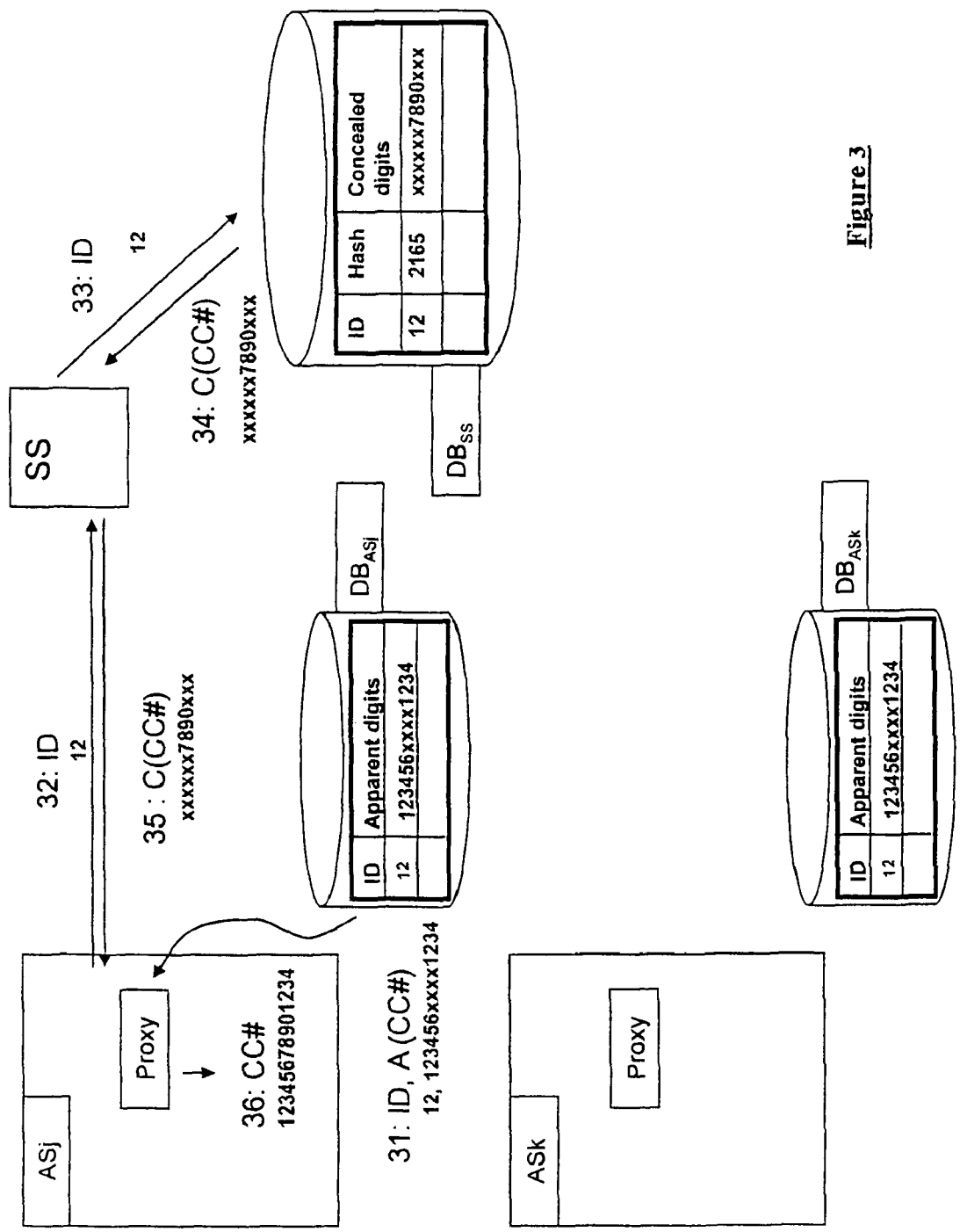
FIG. 3 is a high level block diagram illustrating a first use case of sensitive information retrieval.
Figure 4:
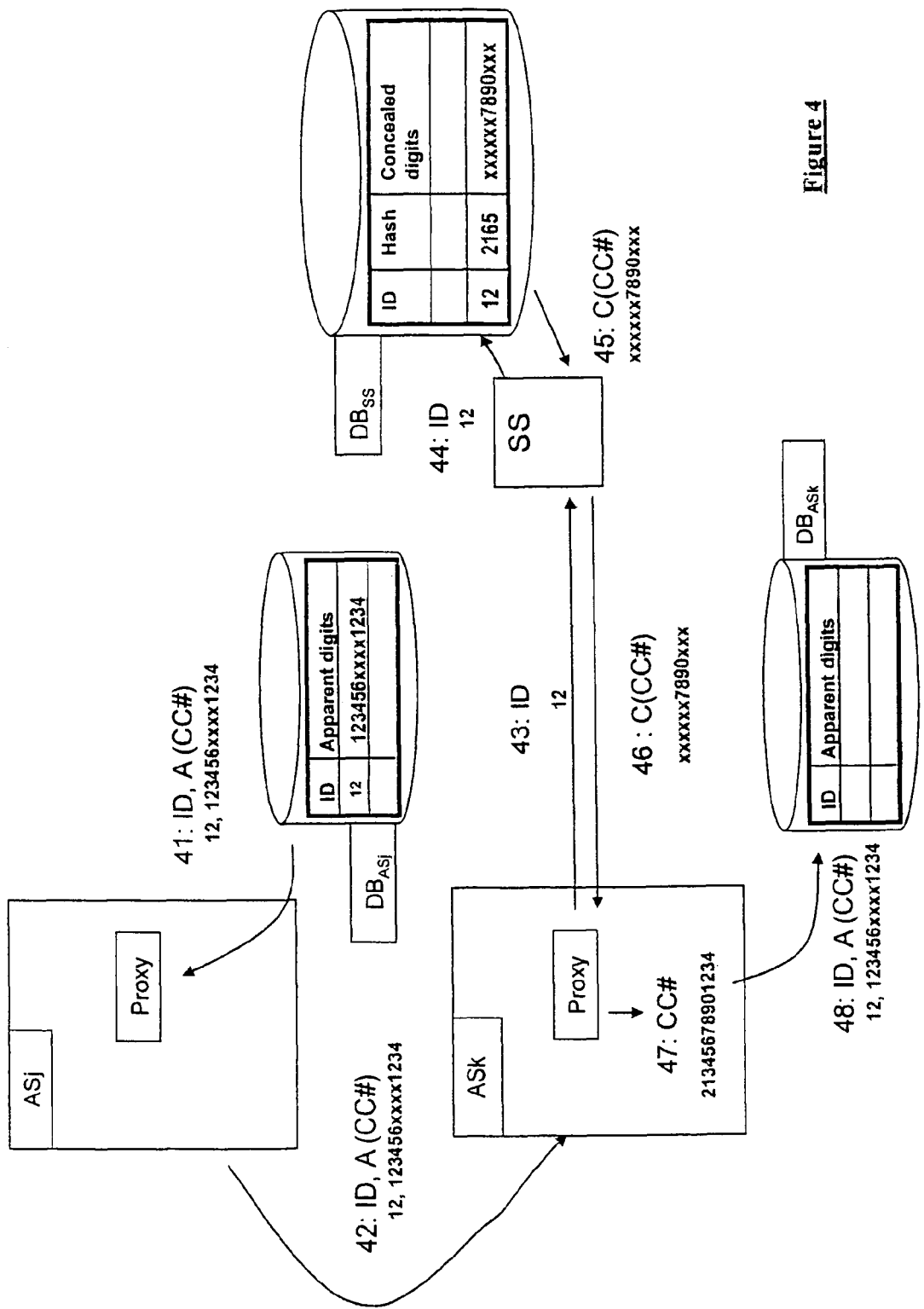
FIG. 4 is a high level block diagram illustrating a second use case of sensitive information retrieval.

With reference to FIGS. 3 and 4 a use case illustrating the retrieval of the credit card number CC# is detailed below.

FIG. 3 illustrates an event wherein the first application system $AS_j$ or any application system that has the apparent digits A(CC#) stored in its database $DB_{ASj}$ needs to retrieve the credit card number CC#.

To this end, at step 31 the first application system $AS_j$ receives the index ID from its database. Then, at step 32 it sends the index ID to the server system SS. The server system SS retrieves from its database $DB_{SS}$ the concealed digits C(CC#) indexed with said index ID (steps 33 and 34). The server system SS further sends the concealed digits C(CC#) to the first application system $AS_j$ (step 35).

First application system $AS_j$ retrieves from its database $DB_{ASj}$ the apparent digits A(CC#) which is indexed with the index ID. Finally, the first application system $AS_j$ combines the apparent digits A(CC#) and the concealed digits C(CC#) received from the server system SS in order to rebuild the credit card number CC# (step 36).

FIG. 4 illustrates a second event wherein the credit card number CC# needs to be retrieved at any application system $AS_k$ which has not previously generated and stored the apparent credit card number A(CC#) indexed with the index ID. Said any application system $AS_k$ is therefore different from the first application system $AS_j$ and is designated second application system $AS_k$ in the following.

The various applications systems $ASi_{i=1\ldots n}$ are typed depending on the kind of service they provide. These application systems $ASi_{i=1\ldots n}$ know each other and are able to identify the type of data they respectively require. When a first application system $AS_j$ receives a data that is useful for other application systems, then the first application system $AS_j$ sends this data to said other application systems.

The transmission of useful data may be operated automatically once said data is available at the first application system $AS_j$.

For example, once apparent digit A(CC#) is generated by $AS_j$ and once index ID is received at $AS_j$ from the server system SS, then $AS_j$ sends both apparent digit A(CC#) and index ID to all the application systems that are typed as requiring apparent digit A(CC#) and index ID (steps 41, 42).

Then each application system that is provided with said useful data can use it. For instance, as soon as second application system $AS_k$ receives both apparent digit A(CC#) and index ID (step 42) from $AS_j$ it can obtain the credit card number CC#. More precisely, upon reception of index ID, second application system $AS_k$ sends this index ID to the server system SS (step 43). The server system SS retrieves from its database $DB_{SS}$ the concealed digits C(CC#) indexed with said index ID (steps 44 and 45). The server system SS further sends the concealed digits C(CC#) to second application system $AS_k$ (step 46). Then, second application system $AS_k$ combines the apparent digits A(CC#) received from first application system $AS_j$ and the concealed digits C(CC#) received from the server system SS in order to rebuild the credit card number CC# (step 47). Finally, the application of the second application system $AS_k$ can use the card number CC#.

Advantageously, the second application system $AS_k$ stores in its database $DB_{ASk}$ the apparent credit card number A(CC#) indexed with the index ID (step 48). Thus, next time the second application system $AS_k$ will be able to obtain the credit card number CC# without requiring that the first application system $AS_j$ forwards the apparent digits A(CC#).

This embodiment implies that apparent digit A(CC#) and index ID are transmitted together. This embodiment is particularly advantageous in an environment wherein all the applications are run by a single organization and wherein the interactions between the various applications are totally user transparent. In particular the final user (card holder) is not supposed to access the index ID assigned to his credit card number CC#.

As illustrated in the use cases of FIGS. 3 and 4 the full credit card number CC# is never exchanged nor stored. The credit card number CC# is only available during its use at a considered application system $AS_k$ when said considered application system $AS_k$ handles a process that requires said credit card number CC#. Typically, the credit card number CC# is stored in the process memory and nowhere else. Once the use is completed, the credit card number CC# is removed. Besides, the apparent digits A(CC#) and concealed digits C(CC#) are not stored in the same database. Therefore, sniffing the network or stealing any one of the databases does not enable to obtain the credit card number CC#.

Use cases of FIGS. 3 and 4 also illustrate that several distributed application systems can exchange data in order to enable a considered application $AS_k$ to obtain the required credit card number CC# though this given application has never been provided so far with said credit card number CC# or with apparent digits A(CC#). Accordingly, the invention provides a secured method that obviates the need for customers to re-enter credit card number CC# once said credit card number CC# has already been entered in any one of the application systems of the distributed environment. Besides, the exchange of data between various application systems is totally user transparent.

Figure 5:
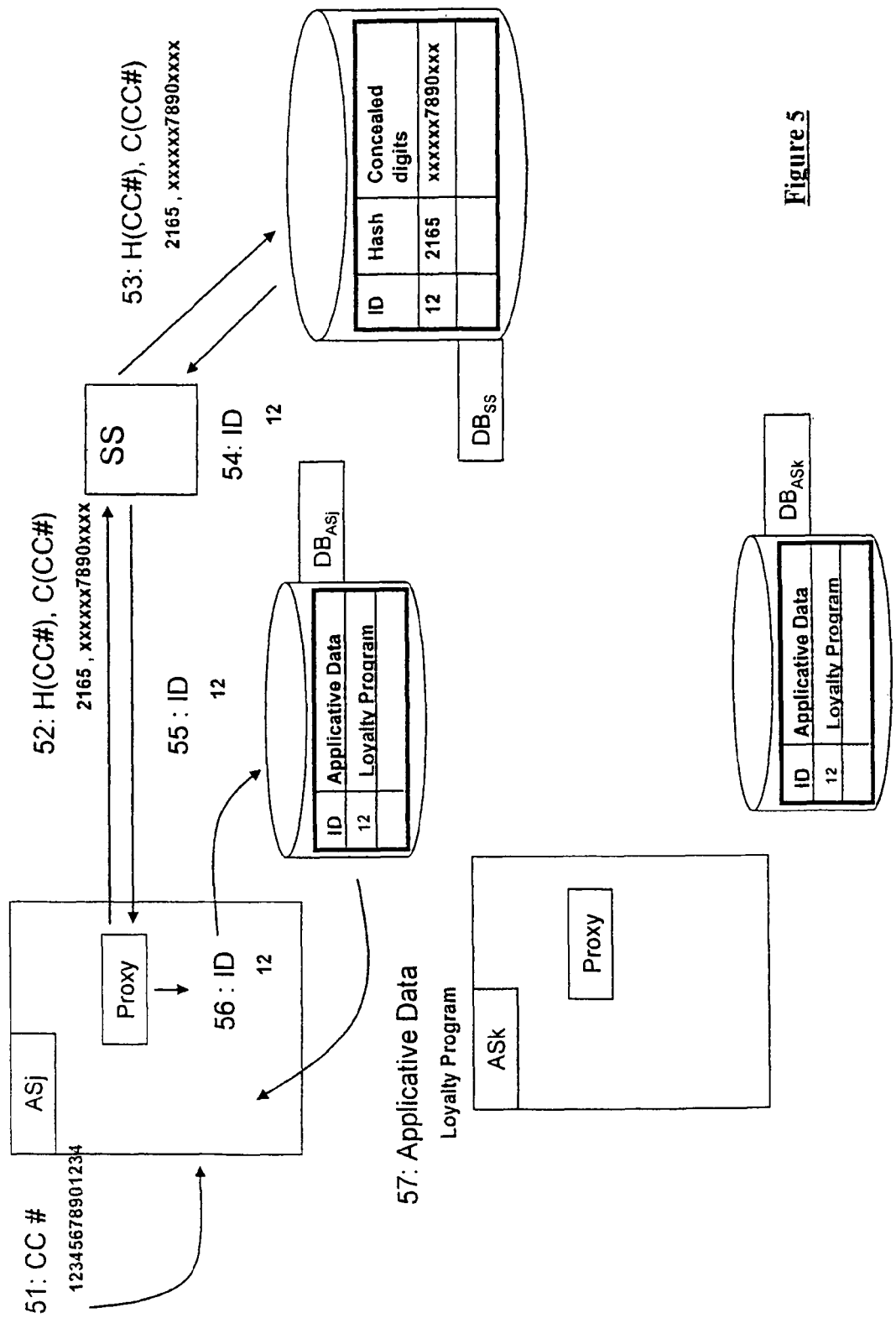
FIG. 5 is a high level block diagram illustrating a first use case of applicative data retrieval.
Figure 6:
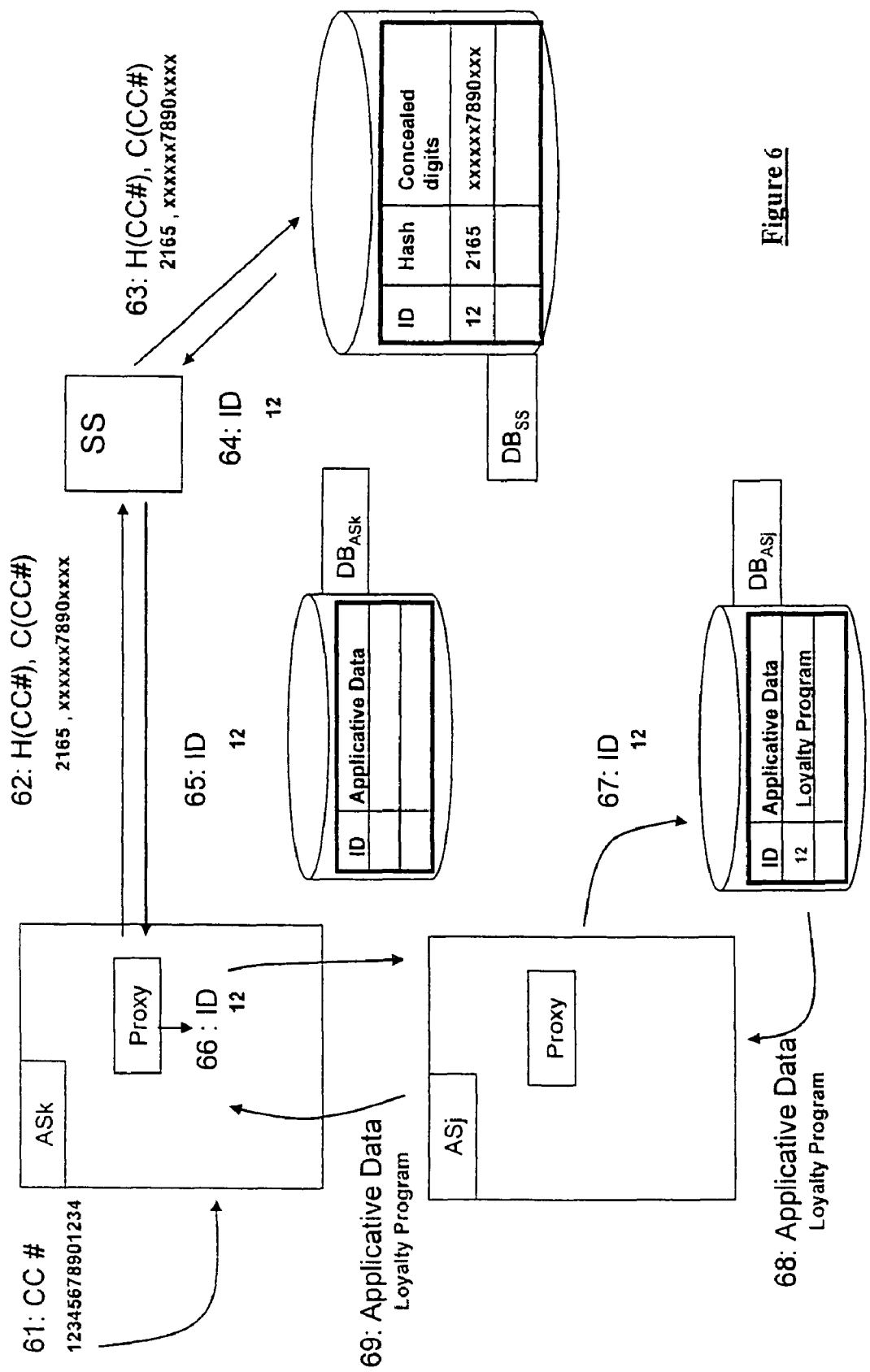
FIG. 6 is a high level block diagram illustrating a second use case of applicative data retrieval.

With reference to FIGS. 5 and 6 a use case illustrating the retrieval of an applicative data related to the credit card number CC# is detailed below. These applicative data are intended to be used by at least an application system. Besides, said applicative data do not require a high level of security. Therefore applicative data can be stored as such in the database of the given application. For instance, applicative data may relate to a user profile data (user's loyalty program, user's preferences, user's photo etc.)

FIG. 5 illustrates an event wherein the application system which needs to use the applicative data has already stored it and indexed it in its database. Such applicative system is designated in the following first application system $AS_j$.

At step 51 the first application system $AS_j$ receives the credit card number CC#. Then, it generates the concealed digits C(CC#) and the encoded credit card number H(CC#) from said credit card number CC#. At step 52, it sends the concealed digits C(CC#) and the encoded credit card number H(CC#) to the server system SS. Then, the server system SS retrieves from its database $DB_{SS}$ the index ID corresponding to both concealed digits C(CC#) and encoded credit card number H(CC#) (steps 53 and 54). Then the server system SS forwards the index ID to the first application system $AS_j$ (step 55). Upon reception of the index ID, the first application system $AS_j$ retrieves the applicative data indexed with the index ID (step 56 and 57). Finally, the application of the first application system $AS_j$ can use the applicative data.

FIG. 6 illustrates an event wherein the database of the application system which needs to use the applicative data does not store or index said applicative data in its database. Such applicative system is designated in the following second application system $AS_k$.

At step 61 the second application system $AS_k$ receives a credit card number CC#. Steps 62, 63, 64, 65 are substantially identical to steps 52, 53, 54, 55 detailed above. At step 65 the second application system $AS_k$ receives the index ID from the server system SS. After having checked that its database $DBAS_k$ does not store an applicative data indexed with the received index, the second application system $AS_k$ sends this index ID to the first application system $AS_j$ (step 66). The first application system $AS_j$ searches its database $DB_{ASj}$ and retrieves the applicative data indexed with the index ID (steps 67 and 68). Then the first application system $AS_j$ forwards the applicative data to the second application system $AS_k$ (step 69). Finally the applicative data is available for use at an application of the second application system ASk.

Advantageously, the second application system $AS_k$ stores in its database DBASk the applicative data indexed with the index ID.

Thus, applicative data can be quickly retrieved provided the applicative data has already been indexed and stored in any database and provided that the credit card number has already been entered once.

This allows easy and user friendly usage of applicative data rendering therefore applications more attractive for users. Besides, the exchange of data between various application systems is totally user transparent.

Like for the use cases that relates to credit card number retrieval, in use cases addressing applicative data retrieval the risk of theft of the credit card is significantly reduced since neither an applicative system $AS_j$, $AS_k$, nor the server system SS keeps the full credit card number CC#. Besides, neither is full credit card number CC# ever transmitted in a single transmission between any application system $ASi_{i=1...n}$ and the server system SS or between two application systems $AS_j$, $AS_k$.

In a preferred embodiment, the storage system comprises at least a processing and transaction module at an application system. As illustrated on the particular embodiments of FIGS. 2 to 6, the system comprises a proxy component at each application system. According to another embodiment only some of the application systems may be associated to a proxy component. The proxy component is part of the secured storage system. The proxy handles at least some of the following steps that are intended to occur at an application system wherein said proxy component is included:

generating the apparent digits A(CC#) and the concealed digits C(CC#) from the credit card number CC#,
generating the encoded H(CC#) credit card number from said credit card number CC#,
sending the concealed digits C(CC#) and the encoded credit card number H(CC#) to the server system SS,
sending the index ID to the server system SS for further credit card number CC# retrieval,
sending the apparent digits A(CC#) in the database associated to the application system,
retrieving the apparent digits A(CC#) from the database associated to the application system,
generating messages including the data to be sent from the application system to the server system or to other application systems, said messages being in EDIFACT like format,
reading messages received from the server system or from other application systems, said messages being in EDIFACT like format.

Typically, the proxy component can be a middleware library. It provides various API (Application Programming Interfaces) that interface the application software of the application system with the server system. The proxy component can also comprise a cache mechanism. The cache mechanism is arranged to store the credit card number CC# during the processing of said credit card number CC#. There is one cache instance per process so that the credit card number CC# is no more available once it has been used by the application of the application system.

Through handling credit card number CC# processing and data exchanges, the proxy component significantly facilitates the integration of any application in the system of the invention.

What is claimed is:

1. A method of storing and retrieving a sensitive information which requires being secured in an environment comprising a plurality of application systems that can use said information, storing said information comprising the following steps:

at a given application system of said plurality of application systems:
  receiving said information,
  generating from said information an extracted data and a complementary data, such that said extracted data and said complementary data taken independently being insufficient for using said information and such that said information generated from said extracted and complementary data taken together,
  generating an encoded information from said information,
  sending the extracted data and the encoded information to a server system,
at the server system:
  generating an index and assigning this index to the encoded information and the extracted data,
  storing the encoded information, the extracted data, and the index in a database associated to the server system,
  forwarding the index to said given application system of the plurality of application systems,
at said given application system:
  assigning the index to the complementary data,
  storing the index along with said complementary data in a database associated to said given application system.

2. The method of claim 1, wherein retrieving said information at any considered application system amongst the plurality of application systems comprises the following steps:

at said considered application system:
  receiving the index,
  sending the index to the server system,
at the server system:
  retrieving from the database of the server system the extracted data corresponding to said index,
  sending the extracted data to said considered application system,
at said considered application system:
  receiving the complementary data,
  rebuilding the information from the extracted and the complementary data.

3. The method of claim 2, wherein said considered application system is the given application system and wherein receiving the complementary data at said considered application system comprises retrieving based on the index the complementary data which is stored in the database associated to the given application system.

4. The method of claim 2, wherein said considered application system is an application system which is different from the given application system and which does not comprise a database that stores the index along with the complementary data and wherein receiving the complementary data at said considered application system comprises receiving the complementary data from the given application system.

5. The method of claim 1, wherein the step of generating complementary data and extracted data includes dividing the information into a first portion and a second portion.

6. The method of claim 5, wherein the information is a credit card number and wherein the complementary data correspond to apparent digits of the credit card number and the extracted data correspond to concealed digits of the credit card number.

7. The method of claim 1, wherein the step of generating an encoded version of the information includes computing an hashed value of the information with an hash function, the hashed function being unknown to the server system.

8. The method of claim 1, wherein at least one of the following steps conducted at any application system is handled by a proxy component:
- generating the complementary data and the extracted data from the information,
- generating the encoded information from said information,
- sending the extracted data and the encoded information to the server system,
- sending the complementary data in the database associated to the given application system,
- generating messages including the data to be sent from said any application system, said messages being in EDIFACT like format, p1 reading messages including the data to be received at said any application system, said messages being in EDIFACT like format.

9. The method of claim 1, wherein at any time, the information is available only in a process memory of an application system that processes said information.

10. A system for storing and retrieving an information which requires being secured in an environment, comprising a plurality of application systems that can use said information, the system comprising:
- a server system and
- a given application system amongst said plurality of application systems, said given application system being arranged for:
  - receiving said information,
  - generating from said information an extracted data and a complementary data, such that said extracted data and said complementary data taken independently being insufficient for using said information by any application system and such that said information generated from said extracted and complementary data taken together,
  - generating an encoded information from said information,
  - sending the extracted data and the encoded information to a server system,
- the Server System being arranged for:
  - generating an index and assigning this index to the encoded information and the extracted data,
  - storing the encoded information, the extracted data, and the index in a database associated to the server system,
  - forwarding the index to said given application system of the plurality of application systems,
- the given application system being also arranged for:
  - assigning the index to the complementary data,
  - storing the index along with said complementary data in a database associated to said given application system.

11. A method of storing and retrieving an applicative data associated to a sensitive information which requires to be secured in an environment comprising a plurality of application systems uses said information, storing said applicative data comprising the following steps:
- at a given application system of said plurality of application systems:
  - receiving said information,
  - generating from said information an extracted data, such that said extracted data taken independently being insufficient for using said information and such that said information generated from said extracted data and from a complementary data taken together, said complementary data being also generated from said information and being insufficient for using said information when taken independently,
  - generating an encoded information from said information,
  - sending the extracted data and the encoded information to a server system,
- at the server system:
  - generating an index and assigning this index to the encoded information and the extracted data,
  - storing the encoded information, the extracted data, and the index in a database associated to the server system,
  - forwarding the index to said given application system of the plurality of application systems,
- at said given application system:
  - assigning the index to the applicative data associated to the information,
  - storing the index along with said application applicative data in a database associated to said given application system.

12. The method of claim 11, wherein the applicative data is used by at least an application system and does not require a high level of security.

13. The method of claim 12, wherein the applicative data relates to a loyalty program.

14. The method of claim 11, wherein retrieving said applicative data at any considered application system comprises the following steps:
- at said considered application system:
  - receiving said information,
  - generating the extracted data from said information and the encoded information from said information,
  - sending the extracted data and the encoded information to the server system,
- at the server system:
  - retrieving from the database of the server system the index corresponding to both extracted data and encoded information,
  - forwarding the index to said considered application system,
- at said considered application system,
  - receiving the index,
  - retrieving the applicative data indexed with the index.

15. The method of claim 14, wherein said considered application system is the given application system and wherein the applicative data is retrieved from the database associated to the given application system.

16. The method of claim 14, wherein said considered application system is an application system which is different from the given application system and which does not comprise in its associated database the applicative data indexed with the index and wherein retrieving the applicative data comprises the following steps:
- at the given application system,
  - receiving the index corresponding to the applicative data to be retrieved,
  - retrieving in the database of the given application system the applicative data based on the index,
  - sending the application data to the considered application system.

17. The method of claim 11, wherein the step of generating complementary data and extracted data includes dividing the information into a first portion and a second portion.

18. The method of claim 17, wherein the information is a credit card number and wherein the complementary data correspond to apparent digits of the credit card number and the extracted data correspond to concealed digits of the credit card number.

19. The method of claim 11, wherein the step of generating an encoded version of the information includes computing an hashed value of the information with an hash function, the hashed function being unknown to the server system.

20. The method of claim 11, wherein at least one of the following steps conducted at any application system is handled by a proxy component:
   generating the extracted data from the information,
   generating the encoded information from said information,
   sending the extracted data and the encoded information to the server system,
   generating messages including the data to be sent from said any application system, said messages being in EDIFACT like format,
   reading messages including the data to be received at said any application system, said messages being in EDIFACT like format.

21. The method of claim 11, wherein at any time, the information is available only in a process memory of an application system that processes said information.

22. A system for storing and retrieving an applicative data associated to an information which requires to be secured in an environment, comprising a plurality of application systems that can use said applicative data, the system comprising:
   a server system and
   a given application system amongst said plurality of application systems, said given application system being arranged for:
      receiving said information,
      generating from said information an extracted data, such that said extracted data taken independently being insufficient for using said information by any application system and such that said information generated from said extracted and a complementary data taken together, said complementary data being also generated from said information and being insufficient for using said information when taken independently,
      generating an encoded information from said information,
      sending the extracted data and the encoded information to a server system,
   the Server System being arranged for:
      generating an index and assigning this index to the encoded information and the extracted data,
      storing the encoded information, the extracted data, and the index in a database associated to the server system,
      forwarding the index to said given application system of the plurality of application systems,
   the given application system being also arranged for:
      assigning the index to the applicative data associated to the information,
      storing the index along with said applicative data in a database associated to said given application system.

* * * * *